Patented Jan. 30, 1945

2,368,538

UNITED STATES PATENT OFFICE 2,368,538

COPOLYMERS OF ISOOLEFINS AND DIISO-BUTENYL RING COMPOUNDS

Anthony H. Gleason, Westfield, and William J. Sparks, Elizabeth, N. J., assignors to Standard Oil Development Company, a corporation of Delaware No Drawing. Application December 31, 1941, Serial No. 425,124

15 Claims. (Cl. 260—92.6)

This invention relates to olefinic polymers; relates particularly to interpolymers; and relates especially to interpolymers of an isoolefin with a substituted benzene having unsaturated substituents.

It has been found possible to produce copolymers of a considerable range of olefinic substances and a limited number of monoolefins have been found to yield simple polymers. To the present, however, the interpolymers of isoolefins with diolefins have been very limited in number and they show relatively narrow ranges of physical and chemical properties.

The present invention provides a series of new and valuable interpolymers of an isoolefin, such as isobutylene with a substituted aryl compound having unsaturation in the substituent radicals, such as diisobutenyl benzene. The reaction is a general one, applicable to isoolefins generally within the range of four carbon atoms to about eight, ten or twelve carbon atoms; and the general group of aryl compounds having two isobutenyl substituents. Thus the range of isoolefins consists of isobutylene, the isoamylenes, the isohexylenes, the isoheptylenes, the isooctylenes and their homologs, with diisobutenyl aryl compounds generally, such as diisobutenyl benzene, diisobutenyl naphthalene, diisobutenyl toluene, diisobutenyl zylene, diisobutenyl styrene and their homologs. The reaction is also applicable to the halogenated derivatives of these isobutenyl aryl compounds.

It appears that the requirement for the reaction is the diisobutenyl substituted ring compounds and it does not appear to be significant whether or not other substituents are present, nor what these other substituents are, although the hydrocarbon substituents and halogenated substituents are preferable.

Thus, the object of the invention is to interpolymerize a diolefin substituted aryl compound with an isoolefin. Other objects and details of the invention will be apparent from the following description.

In practicing the present invention, a mixture is prepared consisting of an isoolefin in the ratio of from 98 to 20 parts with an aromatic diolefin in the ratio of 80 to 2 parts. This mixture of olefinic material may, if desired, be diluted with from 1 to 10 volumes of a diluent, such as an alkyl halide or other inert, low freezing, solvent of the type of ethyl, methyl or butyl chloride or carbon disulfide or the like, and the olefinic material, whether diluted or undiluted, is cooled to a temperature below −10° C., preferably below −40° C.; and conveniently to a temperature of −78° C. an set by carbon dioxide which may be added directly to the olefinic mixture or may be used as a refrigerating jacket for the container in which the olefinic material is held, or to a temperature between −95° C. and −103° C. as set by liquid ethylene, which may be added directly to the diluted or undiluted olefinic mixture or may be used as a cooling jacket.

When the mixture is cooled to the desired low temperature, the polymerization is caused to occur by adding to the mixture from 1 to 50 parts of a solution of aluminum chloride in an alkyl halide, such as ethyl, methyl or propyl chloride or in carbon disulfide or other suitable, inert, low-freezing solvent. The reaction proceeds rapidly to yield the desired interpolymer.

The resulting polymeric product contains a definite amount of unsaturation and may have an iodine number ranging from about 1 when the maximum amount of isoolefin is used, to an iodine number of 100 to 125 when the maximum amount of diolefin substituted aryl compound is used.

The characteristics of the polymeric product vary according to the relative proportions of isoolefin and substituted aryl compound used. All of the forms of the polymer are water white. When the polymer contains approximately equal proportions of the respective components, it is a slightly tacky, more or less plastic resin, substantially insoluble in the common solvents; when the isobutenyl aryl compound is present in substantial excess, the resin tends to be a brittle resin relatively easily powdered and relatively soluble in the various chlorine substituted solvents, such as tetrachlor ethane, chloroform, carbon tetrachloride, and the like. When the isoolefin is present in the majority proportion, the resulting polymer tends to be a soft, rubberlike substance which is reactive with sulfur in a curing reaction to yield a material having a definite elastic limit, an elongation at break of from 300 to 1200%, with a tensile strength at break ranging from 1500 pounds per square inch to 4500 pounds per square inch, depending upon the relative proportions of the isoolefin and the second copolymerizate.

The structural formula of the polymer is entirely unknown but such evidence as is available suggests the possibility that when a diisobutenyl compound is used, it polymerizes in part as an aryl substituted isobutylene, putting the phenyl group into the side chain. Other evidence suggests the possibility that when diisobutenyl benzene is used, the polymerization involves both of the diisobutenyl substituents to place the phenyl group in the linear chain. Other evidence suggests that polymerization may include both of these forms and the character of the structural formula and the nature of the reaction occurring is obviously markedly influenced by the relative proportions of the two components since when the isoolefin is present in excess, over equal molecular proportions, some simple isoolefinic polymerization occurs; likewise, when the isobutenyl substituted aryl compound is present in excess of equal molecular proportions, some other form of polymerization reaction must occur.

*Example 1*

A mixture of 3 parts of isobutylene and 2 parts of diisobutenyl benzene was prepared and diluted with 3 parts (all by weight) of methyl chloride. An excess of solid carbon dioxide was added to the mixture to cool it to a temperature of approximately —78° C. The material was then stirred moderately vigorously and to it were added approximately 10 parts of a methyl chloride solution of aluminum chloride containing approximately 1.5% of aluminum chloride. The polymerization reaction occurred rapidly and was approximately complete after an interval of about four minutes. All of the polymer was recovered by treatment of the polymerized mixture with approximately 50 parts by weight of an alcohol, in this instance, isopropyl alcohol. The liquid residues were poured off from the precipitated polymer and the polymer was brought up to room temperature, at which temperature it was found to be a water-white, slightly tacky resin, insoluble in all of the common solvents. It was found possible to eliminate the tackiness by repeated extractions by benzene or chloroform.

This polymer was found to be responsive to working on the roll mill. It was found possible to mix it with rubberlike materials both natural rubber and the various olefinic polymers, such as polyisobutylene and the olefinic-diolefinic polymer of isobutylene with such diolefins as butadiene, isoprene, propylene, dimethyl butadiene and the like. It showed the property of combining with sulfur in a curing reaction like that to which the isobutylene-diolefinic interpolymer responds. For this purpose, the polymer was compounded on the mill according to the following formula:

| | Parts |
|---|---|
| Polymer | 100 |
| Carbon black | 50 |
| Stearic acid | 5 |
| Zinc oxide | 3 |
| Sulfur | 3 |
| Tuads (tetra-methylthiuram disulfide) | 1 |

This compound was prepared by milling the polymer for a few minutes on the mill until it was adequately plasticized and then adding the successive components and milling them in, the Tuads being added last after cooling the mill. The material is cured by heat treatment, preferably under pressure at a temperature of 135° C. for a time interval of about 60 minutes, to yield a high grade cured rubberlike material of good tensile strength, high elongation, high abrasion resistance, and good flex resistance.

The above example utilizes isobutylene and diisobutenyl benzene as representative substances. As above pointed out, however, the reaction is not limited to such substances. The disobutenyl benzene is conveniently prepared by the Grignard reaction between 1,4-dibromo benzene and methallyl chloride. The reaction proceeds smoothly and easily, to yield the desired diisobutenyl benzene according to the following equation.

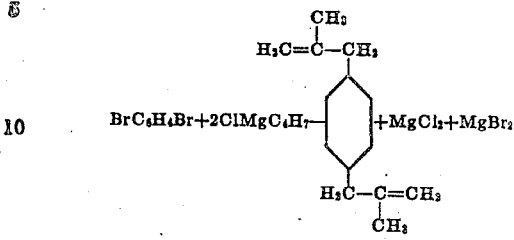

*Example 2*

Equal parts by weight of isobutylene and diisobutenyl benzene were mixed, cooled in the absence of a diluent or diluent-refrigerant by the addition of solid carbon dioxide directly to the olefinic mixture and the material was polymerized by the addition to the cooled olefins of approximately 10 parts of a solution of aluminum chloride in methyl chloride, having a concentration of approximately 1.5%. The reaction proceeded rapidly and was substantially complete in less than 5 minutes. The mixture was substantially completely polymerized and as much of the catalyst solution as could be removed was poured off. The polymer was then brought up to room temperature and was found to be a brittle resin, non-tacky, which could be easily powdered and was found to be soluble in tetrachlor ethane.

This material was found to have an iodine number of approximately 50 and a relatively very high molecular weight, apparently well above 1,000 and probably above 5,000 to 10,000. These and other experiments indicate that polymers having molecular weights from 1,000 to 100,000 or above, probably as high as 500,000, are relatively easily prepared. This polymer is found to have a higher solubility than the polymer produced in Example 1. It also is reactive with sulfur and is compatible with the cellulose esters, chlorinated rubber, natural rubber and the like, and it is readily compounded and cured by the use of the same formula and procedure described in Example 1.

*Example 3*

100 parts of pure diisobutenyl benzene were mixed with 200 parts by weight of methyl chloride, and cooled by submerging the container in a liquid propane bath at a temperature of approximately —40° C. Approximately 60 parts by weight of a saturated solution of aluminum chloride in ethyl chloride containing about 5% of aluminum chloride were then added to the cooled mixture. The polymerization proceeded rapidly, and at the end of the polymerization reaction, the material was treated with alcohol to destroy the catalyst and precipitate any polymer dissolved in the ethyl chloride. The residual liquid was then poured off and the polymer was brought up to room temperature. It was found to be a water-white, brittle resin, thermoplastic and insoluble in the common solvents.

This polymer is much like the polymer produced by the procedure outlined in Examples 1 and 2, except that it is thermoplastic and even less soluble. It shows a good strength, although it is not an elastic rubberlike substance. It is, however, excellently adapted to thermoplastic molding, producing a high grade molding composition either in the form of the pure resin or when reinforced with pigments or fibres, either organic or inorganic.

*Example 4*

A mixture of 98 parts of isobutylene with 2 parts by weight of diisobutenyl benzene was prepared and diluted with 1 volume of liquid ethylene, thereby bringing the temperature to a temperature of approximately −98° C. To this cooled mixture, there was then added approximately 10 parts of an ethyl chloride solution of aluminum chloride containing approximately 1.5% of aluminum chloride. Polymerization proceeded rapidly and was substantially complete in less than 5 minutes. The residual liquid ethylene and methyl chloride were poured off from the solid polymer and the polymer brought up to room temperature. It was found to be a soft, rubberlike product soluble in the ordinary hydrocarbon solvents. It was found to have a molecular weight of approximately 20,000, and an iodine number of approximately 10.

This polymer likewise is a rubberlike, elastic, plastic substance, which is reactive with sulfur in a curing reaction in a manner closely similar to the polymer in Example 1. This polymer is compatible with substantially all of the natural and synthetic rubberlike substances and it is readily compounded and cured in a formula similar to that in Example 1, either alone or in combination with natural rubber, the various polybutadienes, known as "Buna," "Perbunan" and "Buna-S." When so compounded, particularly valuable compositions of matter are obtained which show the property of high tensile strength, excellent elongation, good solvent resistance and many other important properties.

The above examples show the preferred embodiment of the invention in the form of copolymers of isobutylene with diisobutenyl benzene, but other valuable and important polymers are obtainable from other analogous substances.

*Example 5*

A similar mixture of 3 parts of isobutylene with 2 parts of diisobutenyl naphthalene was prepared as in Example 1, and a similar plastic, elastic copolymer was obtained.

*Example 6*

A mixture of isobutylene and diisobutenyl styrene was prepared as in Example 2, the two substances being present in approximately equal proportions and the mixture was dissolved in an excess of methyl chloride and cooled by the addition of carbon dioxide. The polymerization reaction was conducted in the presence of aluminum chloride, dissolved in methyl chloride, to yield a similarly highly valuable polymer, in many ways like the polymer of Example 1.

*Example 7*

A similar mixture of approximately equal parts of isobutylene and diisobutenyl benzene was prepared, cooled and polymerized as in Examples 1 and 2, to yield a similar high grade interpolymer of the materials.

Similar reactions have been found to occur with isoamylene and these various diisobutenyl compounds and also the same reaction occurs between isobutylene, isoamylene and the above-mentioned isoolefins and the various chloro substituted diisobutenyl benzene, diisobutenyl naphthalene, diisobutenyl toluene, diisobutneyl xylene and diisobutenyl styrene. These examples and instances hereinabove given are representative examples of the reaction. However, the reaction is a general one between isoolefinic and isobutenyl aryl compounds, all of which are polymerizable by the dissolved aluminum chloride catalyst as above pointed out, to yield valuable resinous or rubbery polymers.

From the examples as above presented, it will be observed that the essence of the invention is a method of producing a polymer and interpolymer having characteristics ranging from a soft, plastic, elastic rubberlike substance to a hard, brittle, water-white resin, in which the solubility may range from substantially complete insolubility in the ordinary solvents, to ready solubility in hydrocarbon or chlorinated hydrocarbon solvents and may range from substantially complete non-thermoplasticity to thermoplasticity at a convenient temperature ranging from 100° C. to about 200° C. Thus the invention consists in an interpolymer of an isoolefin, such as isobutylene or isoamylene or isohexylene or like interpolymers with a diisobutenyl substituted aryl compound, such as diisobutenyl benzene, diisobutenyl toluene and the like.

While there are above disclosed but a limited number of embodiments of the invention, it is possible to produce still other embodiments without departing from the inventive concept herein disclosed and it is therefore desired that only such limitations be imposed upon the appended claims as are stated therein or required by the prior art.

The invention claimed is:

1. A composition of matter comprising a polymer of isobutylene with diisobutenyl benzene.

2. A composition of matter comprising a polymer of isobutylene with diisobutenyl styrene.

3. A composition of matter comprising a polymer of isobutylene with diisobutenyl naphthalene.

4. The method of polymerizing a diisobutenyl substituted aryl compound comprising the steps of mixing it with isobutylene, cooling the mixture to a temperature below −10° C. and catalyzing the polymerization reaction therein by the application to the mixture of a solution of aluminum chloride in an alkyl halide of less than 6 carbon atoms.

5. The method of polymerizing an interpolymer of isobutylene and diisobutenyl benzene, comprising the steps of mixing the two substances, cooling the mixture to a temperature within the range of −10° C. and −103° C., catalyzing the polymerization reaction therein by the application to the cooled mixture of a cold solution of aluminum chloride in methyl chloride.

6. A composition of matter comprising a polymer of an aryl substance having a plurality of iso-olefinic substituents.

7. A composition of matter comprising a polymer of a di-isobutenyl substituted aryl compound.

8. A composition of matter comprising a polymer of an aryl substance having a plurality of iso-olefinic substituents characterized by a molecular weight within the range of 1,000 to 500,000.

9. A composition of matter comprising an interpolymer of an isoolefin with a di-isobutenyl substituted aryl compound.

10. A composition of matter comprising an interpolymer of isobutylene with an aryl compound having a plurality of isobutenyl substituents.

11. A composition of matter comprising an interpolymer of isobutylene with an aryl compound having two iso-olefinic substituents.

12. The method of polymerizing a di-isobutenyl substituted aryl compound comprising the steps in combination of cooling the diisobutenyl aryl compound below −10° C. and applying thereto a catalyst comprising a solution of aluminum chloride in an alkyl halide solvent having less than 5 carbon atoms to the molecule.

13. A composition of matter comprising a polymer of diisobutneyl benzine.

14. A composition of matter comprising a polymer of diisobutenyl styrene.

15. A composition of matter comprising a polymer of diisobutenyl naphthalene.

ANTHONY H. GLEASON.
WILLIAM J. SPARKS.